United States Patent [19]

Pawlowski et al.

[11] Patent Number: 5,192,464
[45] Date of Patent: Mar. 9, 1993

[54] EVAPORATIVE COOLER

[76] Inventors: Lech Pawlowski; Andrew Pawlowski, both of 11 Clearview Ave., Belair, Australia

[21] Appl. No.: 872,416

[22] Filed: Apr. 23, 1992

[51] Int. Cl.⁵ .................. B01F 5/00; B01F 3/04
[52] U.S. Cl. .......................... 261/27; 261/29; 261/112.2; 261/97; 261/DIG. 46; 415/13
[58] Field of Search ............. 261/26, 27, 29, 112.2, 261/DIG. 46, 97; 416/205; 415/13

[56] References Cited

U.S. PATENT DOCUMENTS

| | | | |
|---|---|---|---|
| 2,287,297 | 6/1942 | Dewey | 261/26 |
| 2,664,961 | 1/1954 | Goede | 416/205 |
| 2,939,687 | 6/1960 | Goettl | 261/26 |
| 3,262,682 | 7/1966 | Bredberg | 261/112.2 |
| 3,450,393 | 6/1969 | Munters | 261/112.2 |
| 3,978,174 | 8/1976 | Peer | 261/29 |
| 4,400,185 | 8/1983 | Goettl | 261/29 |
| 4,428,890 | 1/1984 | Harrell | 261/29 |
| 4,464,315 | 8/1984 | O'Leary | 261/DIG. 46 |
| 4,479,366 | 10/1984 | Lanier et al. | 261/24 |
| 4,615,182 | 10/1986 | Worthington | 261/27 |
| 4,774,030 | 9/1988 | Kinkel et al. | 261/29 |
| 5,130,063 | 7/1992 | Collins | 261/106 |

FOREIGN PATENT DOCUMENTS 554195 4/1981 Australia .

Primary Examiner—Tim Miles
Attorney, Agent, or Firm—Richard C. Litman

[57] ABSTRACT

Improvements to an evaporative cooler having a direct drive fan include mutual adjustment of motor speed and fan blade pitch, a simplified, clog resistant water distribution system, a fan shroud creating minimal air flow noise, and a fouling sensor in the water supply. An adjustable variable frequency controller determines motor speed, which complements selected fan blade pitch to operate the fan at a desired speed consistent with avoiding resonance and vibration. The fan shroud has a canted top surface and rounded corners to minimize air flow disturbance. A sensor monitors the water supply for excessive mineral fouling, and activates a drain valve if a present threshold is encountered. A refill valve enables resupply with fresh, unfouled water.

11 Claims, 3 Drawing Sheets

EVAPORATIVE COOLER

FIELD OF THE INVENTION

The present invention relates to evaporative air coolers, and more particularly to improvements thereof.

Evaporative air coolers have traditionally been large, heavy and noisy. Despite steps to reduce bulk, pass, and noise, such as plastic construction disclosed in U.S. Pat. No. 4,479,366, issued to Ted B. Lanier et al. on Oct. 30, 1984, prior art evaporative coolers remain encumbered by these detriments.

Direct driven fan type evaporative coolers having fan casings favorably configured to direct air flow have been developed, as exemplified by U.S. Pat. No. 4,400,185, issued to Adam D. Goettl on Aug. 23, 1983, and Australian Pat. No. 554195 issued to one of the present inventors, Lech Pawlowski, on Apr. 24, 1981.

Despite these and other improvements which have furthered a trend towards reduced bulk, weight and noise level, evaporative coolers have yet to attain widespread popularity in residential applications. Bulk, weight, and noise are tolerable to a greater degree in industrial or commercial buildings. But in residences, particularly single family dwellings, the above barriers persist.

Weight is objectionable since it adds to difficulty of installation and may overload the roof of a typical residence.

Size may be objectionable since the resultant obtrusiveness of the unit may spoil the aesthetics of a building. In fact, in certain communities, municipal or private regulations now limit visibility or height of roof mounted air conditioning equipment.

Noise levels remain a problem since a typical residence is of light construction; that is, walls, floors and ceilings conduct sound. Also, a typical residence is sufficiently compact that occupants throughout the building remain in close proximity to the air conditioning equipment.

Reductions in weight will likely render the evaporative cooler less expensive to manufacture and easier to transport and install. In many cases, the lighter unit can be mounted on a roof without requiring a stand or curb.

Therefore, there remains a need to further reduce bulk, weight, and noise level in evaporative coolers.

None of the above inventions and patents, taken either singly or in combination, is seen to describe the instant invention as claimed.

SUMMARY OF THE INVENTION

The present invention improves on prior art evaporative coolers in several respects. A significant improvement provides an efficient combination of motor controller and fan, both of which are adjustable to complement the other. A variable frequency motor controller is set to a desired motor speed prior to operation of the cooler. A fan having adjustable fan blade pitch is also set to a desired pitch. A balance is struck between motor speed and desired fan output. If an objectionable vibration or resonance is encountered, the speed at which fan output is achieved may be modified by changing the pitch, and the motor speed varied accordingly by resetting the motor controller. The desired fan output will be achieved while the objectionable operational speed is avoided.

A second improvement is a simplified and improved water distribution system having clog resistant water delivery orifices. In a further improvement, a more effective evaporative medium is employed.

Fouling of the evaporative medium by deposition of minerals in the water is minimized by a flushing effect provided by water circulation and by limiting mineral level in the water supply. Upon detection of objectionable fouling, the water supply is drained and replaced.

Accordingly, an object of the present invention is to reduce motor size of an evaporative cooler.

A second object is to provide adjustability of an evaporative cooler fan to effect operation at a speed avoiding vibration due to imbalance and resonant frequency.

A third object is to reduce the weight of an evaporative cooler.

A fourth object is to operate an evaporative cooler at a selected rotational speed.

Another object is to reduce the vertical height of an evaporative cooler.

Still another object is to reduce operating noise level of an evaporative cooler.

An additional object is to reduce electrical consumption of an evaporative cooler.

Another object is to reduce mineral fouling of an evaporative medium in an evaporative cooler.

A further object is to provide an improved evaporative medium in an evaporative cooler.

A still further object is to reduce clogging of water discharge orifices in the water distribution system of an evaporative cooler.

Yet another object is to provide a simple water distribution conduit system.

With these and other objects in view which will more readily appear as the nature of the invention Is better understood, the invention consists in the novel construction, combination and assembly of parts hereinafter more fully described, illustrated and claimed with reference being made to the attached drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
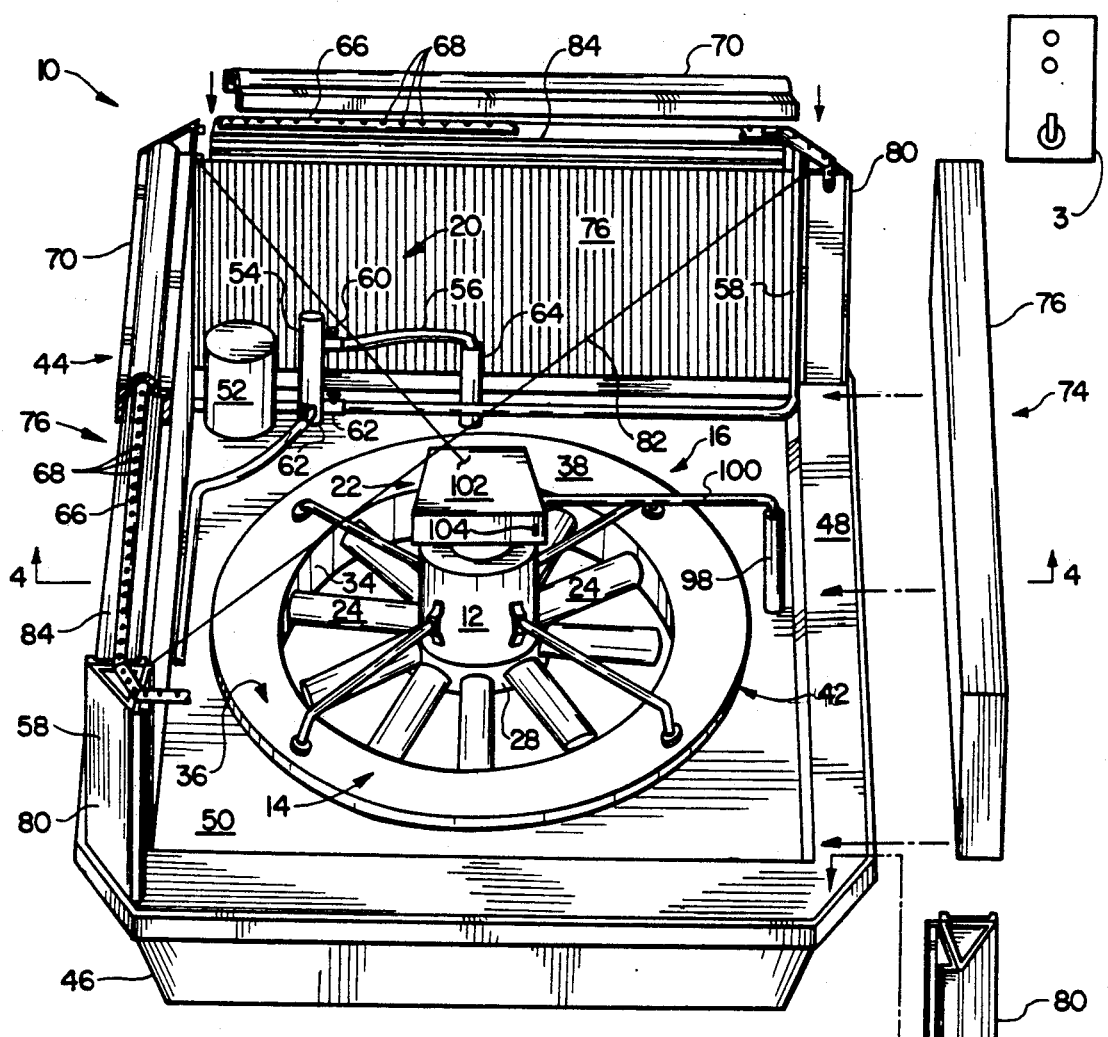
FIG. 1 is a partly sectional, partial exploded perspective view of the invention, with Parts broken away to show interior detail.

The present invention 10 includes improvements to otherwise conventional direct drive evaporative air coolers. The evaporative cooler 10 has an electric motor 12 designed to run on commercial AC power, a direct drive axial fan 14, an air guiding inlet ring 16 partially surrounding the fan 14, outer walls 18 and a water supply system 20 these components 12, 14, 16, 18, 20, found in both the prior art and in the present invention 10, are shown in FIG. 1, the configuration shown being that of the present invention 10.

Figure 2:
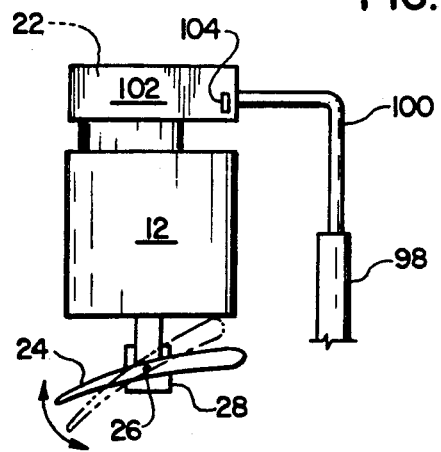
FIG. 2 is a side equational detail view of the motor and fan assembly, also shown in FIG. 1, emphasizing adjustable fan blade pitch.

With reference to FIG. 2, the present invention 10 employs a fan 14 having adjustable fan blade pitch used in conjunction with an adjustable variable frequency motor controller 22. Fan blade pitch is set to provide a maximal air flow (air flow being understood to encompass both volume and pressure) at maximal motor rotational speed the evaporative cooler 10 being designed for fan operation in the range between 600 and 1,700 RPM. Output air flow of the evaporative cooler 10 is adjusted to the desired level by adjusting the variable frequency controller 22. If the speed thus selected results in objectionable vibration, fan blade pitch may be adjusted to produce desired air flow at higher or lower rotational speed.

Adjustment of fan blade pitch is accomplished by manually rotating the fan blade 24 about the central axis of a shaft 26 projecting from the fan hub 28. The blades 24 may be tightened in a desired position by well known methods, locking nuts for example, which need not be shown.

The variable frequency controller 22, shown atop the motor 12 in FIGS. 1 and 2, is the adjusted to run the fan 14 at a new selected speed. This adjustment is manually performed at a remote, wall mounted switch 30, shown in FIG. 1. This wall switch 30 comprises a potentiometer operable to generate a variable signal communicating with and controlling the output frequency of the variable frequency controller 22. A variable frequency controller 22 that has proved effective is model TEK 248, as manufactured by Tekelek Pty. Ltd., of Australia.

This arrangement leads to highly efficient motor operation since a variable frequency controller permits a motor to draw only the electrical power required to move a load, given the motor's efficiency.

This is in contrast to normal practice in which a motor is selected from certain standard outputs which must be at least equal to the load. Speaking generally of fans, since a specific load and a standard motor output usually do not coincide, motors are frequently overly powerful for the load imposed.

AC motors having a particular number of poles typically run at a characteristic speed determined in large part by the line frequency regardless of load. Therefore, lightly loaded AC motors draw almost as much current as those running fully loaded. Hence, electrical consumption closely follows the motor capacity, and not an actual imposed load.

A variable frequency controller 22 is provided in the present invention 10 to adjust the characteristics of the electrical power source to operate the motor 12 at an appropriate speed for the load. Motor output is thus brought into accord with the load, and current consumption is now more closely correlated to the actual load, which load is minimized due to minimized fan size and efficient selection of fan blade pitch.

A fan 14 of variable pitch can be utilized that is smaller than a fan having fixed performance. This lowers the inertial component of the motor load, which may lead to selection of yet a smaller motor. Since the motor 12 and fan 14, considered as an assembly, comprise the heaviest component part of the evaporative cooler 10, it will be appreciated that significant weight reduction occurs as a smaller motor 12 and fan 14 are selected for a specified evaporative cooler 10. Further reduction in fan size and also in noise level are made possible by utilizing more fan blades 24. Generally speaking, whereas prior art units typically employ four bladed fans, ten blades 24 are employed in the present invention 10 to increase fan output and decrease noise, with all other factors remaining equal.

Figure 4:
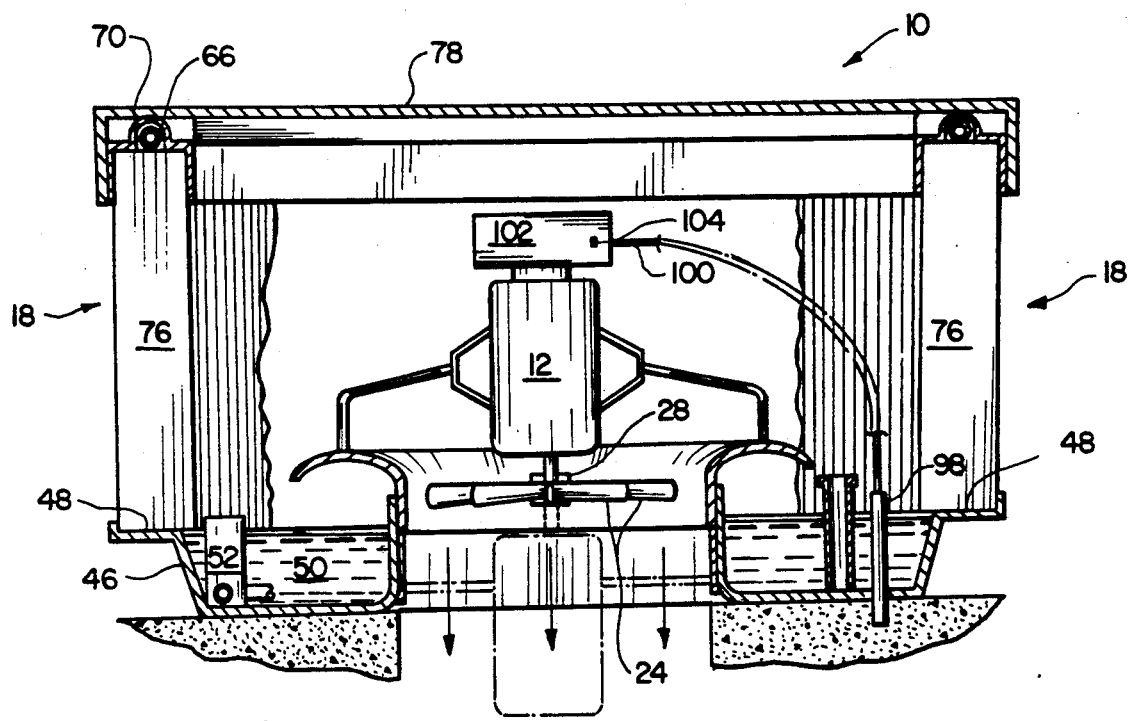
FIG. 4 is a side sectional view of the invention taken along line 4—4 of FIG. 1.

The air inlet ring 16, seen in FIGS. 1 and 4, has a lower section 34 radially surrounding the fan 14 and a flared upper section 36 configured to guide air flow quietly. The slanted upper wall 38 of the flared upper section 36 and the rounded inner and outer corners 40, 42 of the inlet ring 16 operate to produce smooth, laminar air flow, which minimizes air flow noise.

In an alternative embodiment, the motor 12 is mounted in an inverted position, as shown in phantom lines in FIG. 4. Walls 18 are made correspondingly lower. This configuration is used to further reduce the height of the evaporative cooler 10.

The water distribution system 44 comprises a tank 46 open at the top extending around the periphery of the air inlet ring. The tank 46, best seen in FIG. 4, includes a trough 48 which recovers water 50 that has not evaporated in descending through an evaporative medium 53. Water 50, taken from a building potable water supply (not shown), is the substance evaporated in the evaporative cooler 10. The tank 46 is preferably made from non-metallic material to reduce weight and to increase resistance to corrosion. Marine quality fiberglass has proved satisfactory. Other non-metallic materials, such as plastic, could also be used.

As shown in FIGS. 1 and 4, a pump 52 picks up water 50 in the tank 46 and forces this water 50 into a manifold 54. A drain line 56 and two supply conduits 58, 58 have manually adjustable valves 60, 62, 62 (respectively), and exit the manifold 54. When the drain line valve 60 is open, the pump 52 may be used to discharge water 50 from the tank 46 into a drain 64. The remaining valves 62, 62 are used to equalize the flow of water 50 to each supply conduit 58. Equalizing is required when the evaporative cooler 10 is not mounted level on a roof surface (not shown), in which case water would flow in unequal quantities to each supply conduit 58.

The supply conduits 58 (a left hand one more clearly seen in FIG. 1) lead from the manifold 54 to opposite corners of the evaporative cooler 10, and turn upwardly, Each supply conduit 58 then branches into two horizontal discharge conduits 66, each discharge conduit 66 lying above an evaporative medium 53. Each discharge conduit 66 then vents water 50 through discharge slots 68 onto the evaporative medium 53. The water distribution system 44 is thus both uncomplicated and minimizes distance from the farthest discharge slot 68 to the pump 52.

Figure 5:
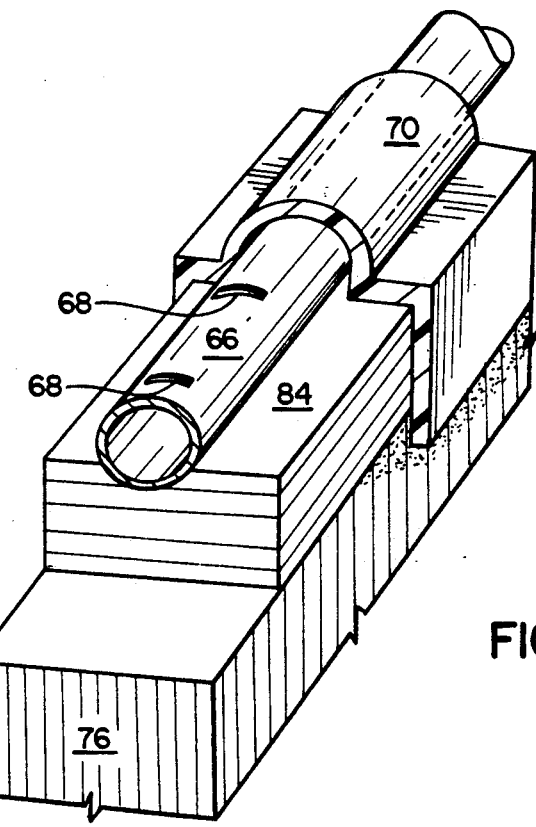
FIG. 5 is a partial perspective detail view of the water distribution system, as seen at the left center of FIG. 1.

Best seen in FIG. 5, discharge slots 68 are radially oriented and upwardly facing. Experience shows that upward facing, elongate discharge slots 68 resist clogging. A close fitting cap 70 directs discharged water 50 downwardly.

Each discharge conduit 66, there being four such conduits 66, delivers water 50 to an evaporative medium 53. The evaporative medium 53 has the ability to conduct water 50 downwardly from the discharge conduit 66 towards the tank 46 while passing air flow in response to fan operation. As the air flows horizontally through the evaporative medium 53, some of the water 50 flowing downwardly therein evaporates and enters the air stream.

Figure 3:
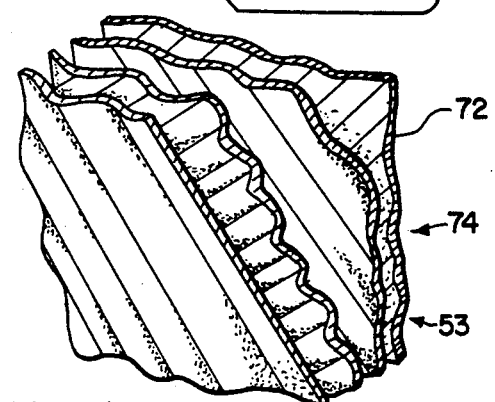
FIG. 3 is a perspective detail showing internal construction of a preferred evaporative medium.

Experience shows that an advantageous evaporative medium 53 is made up from fluted sheets of a cellulosic paper 72, flutes of one sheet of fluted paper being arranged at an angle to those of the next sheet. This construction is shown in FIG. 3. The cellulosic paper 72 is treated with preservatives, stiffening agents, and wetting agents. The evaporative medium 53 will be referred to hereinafter as treated cellulosic cross-fluted paper 74. An example of commercially available treated cellulosic cross-fluted paper 74 is produced my Munters Corporation of Ft. Myers, Fla., under the tradename "CELdek".

As best shown in FIG. 1, the evaporative medium 53 is formed in pads 76 rectangular when viewed in side elevation, and of thickness much less than pad height or length. This configuration presents great surface area to the flow of air induced by the fan 14. In the present invention 10, each wall 18 of the evaporative cooler 10 comprises a single evaporative pad 76. The pads 76 are held in place by being partially surrounded by the trough 48, by a cover 78 of the evaporative cooler 10, by four upstanding corner posts 80, and by support wires 82 holding each corner post 80 under tension to an opposite corner post 80.

To ensure even saturation of the evaporative pads 76, small sections 84 of the evaporative medium 53 are placed between the discharge conduit 66 and the evaporative pad 76. Referring particularly to FIG. 5, but also to FIG. 1, it will be seen that these small sections 84 are oriented such that the sheets of fluted paper run at a right angle to corresponding fluted sheets of the main evaporative pad 76. Water 50 delivered by the conduits 58, 66 therefore spreads laterally through the small section 84, so that the main evaporative pad 76 is wetted across its entire width from top to bottom. Wetted area and consequent efficiency of the evaporative pad 76 are thus maximized.

The water distribution system 44 helps prevent fouling of the evaporative pad 76 by flushing the evaporative pad 76 with water 50 and by monitoring and draining excessively fouled water 50. In normal operation, more water 50 is delivered to the evaporative pads 76 than is evaporated. The excess water 50 flushes the evaporative pads 76, carrying dissolved minerals (not shown) back to the tank 46, rather than permitting deposition on the evaporative pads 76. Because only water 50 evaporates, dissolved minerals can concentrate in tank water 50. Eventually, high concentration can cause precipitation on the evaporative pads 76 upon water evaporation, thus fouling the evaporative pads 76 and reducing evaporative efficiency.

Figure 6:
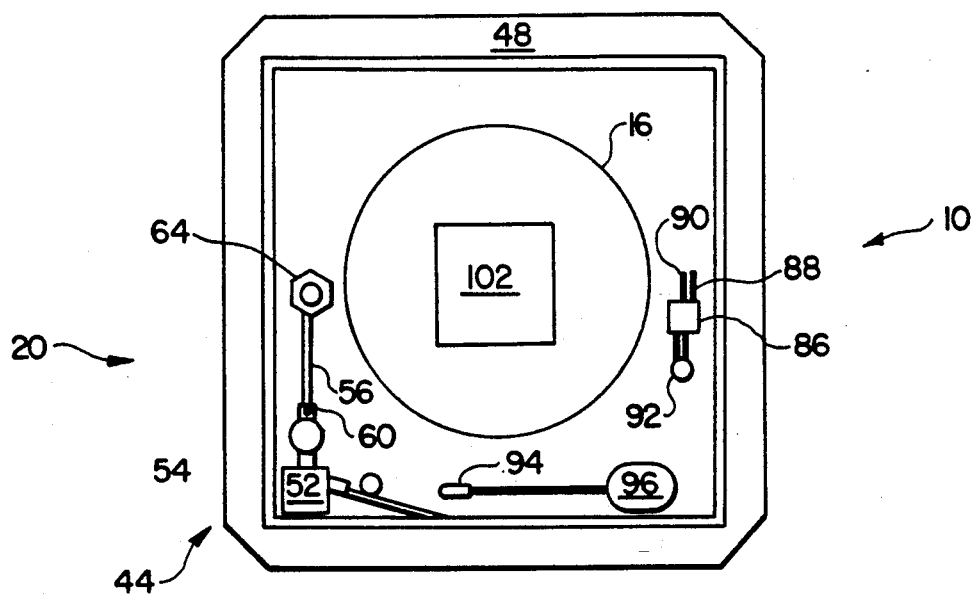
FIG. 6 is a top plan view of the invention with the cover removed to reveal internal components.

The following components 64, 86, 88, 90, 92, 94, 96, 98 controlling water supply are shown in FIG. 6, some having been omitted from other drawing figures for clarity. These components 64, 86, 88, 90, 92, 94, 96, 98 may be located anywhere in the tank 46, and are shown in varying locations in the other drawing figures also for clarity. A fouling sensor 86 located at the tank 46 monitors electrical conductivity of tank water 50. An electrode 88 extending from the fouling sensor 86 into the tank water 50 periodically discharges electric impulses to a second electrode 90. If a present conductivity level is attained, a signal is sent to a dump valve 92, which operates to drain the tank 46. The tank 46 is refilled by a refill valve 94 when a float 64 detects a low level of water 50 in the tank 46 and opens the refill valve 94 accordingly. Fouled water supply is thus replenished by fresh, less fouled water 50.

Of course, an electrical ground conductor could be substituted for the second electrode 90, or a well known capacitance detector or still another type of detector could be substituted for the conductivity responsive system described herein.

The manually operated drain 64, also shown in FIG. 6, is provided for maintenance and service. A conduit 98 penetrates the tank 46 to allow passage of electrical conductors 100. These conductors 100, which comprise residential wiring, are connected at a junction box 102 located atop the motor 12. The junction box 102 includes a disconnect switch 104 required by electrical construction codes and the variable frequency controller 22.

The cover 78, seen in cross section in FIG. 4, spans the entire evaporative cooler 10, excluding dirt and forcing air to enter the evaporative cooler 10 only through the evaporative pads 76.

A synergy is thus achieved which advances the objects of reduced bulk, weight, noise, and energy consumption. Bulk is reduced by minimizing the size of major components such as motor 12 fan 14, and water distribution system 44. These components 12, 14, 44 have been limited to the point that unit height is substantially determined by the height of the evaporative pad 76. The actual height is the sum of the heights of the cover 78, which is virtually negligible, the evaporative pad 76, and the depth of the tank 46. Cooling is dependent upon quantity of water 50 evaporated, which even in arid climates may vary with humidity and temperature.

Figure 7:
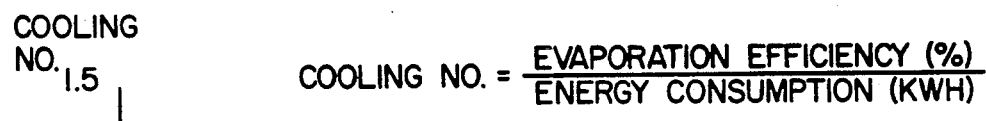
FIG. 7 is a graph comparing cooling output per input energy unit of the present invention and two prior art units.

To allow comparison of motor energy consumption, reference is made to FIG. 7. FIG. 7 compares evaporation per unit of energy input for conventional prior art units, for prior art units using treated cellulosic cross-fluted paper evaporative media, and for the present invention 10. This comparison permits assessment of improvement in performance attributable solely to treated cellulosic cross-fluted paper evaporative media. As may be seen, energy efficiency of a prior art unit using treated cellulosic cross-fluted paper evaporative pads (B) over conventional prior art units (A) is enhanced 25 per cent. The incorporation of improvements of the present invention 10 provides energy efficiency 2.8 times as great as that of the prior art unit using treated cellulosic cross-fluted paper, or, considered in per centage terms, a 180 per cent increase.

Figure 8:
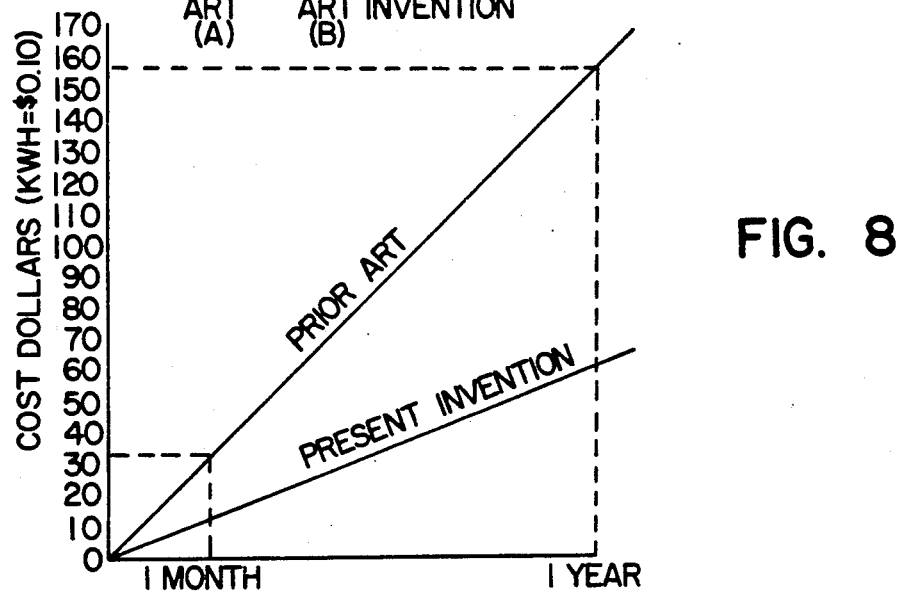
FIG. 8 is a graph comparing operating costs of the present invention and a prior art unit.

To appreciate the economic savings in an evaporative cooler 10 operated 8 hours per day, it may be seen from FIG. 8 that cost savings approximate $100 per year. The novel evaporative cooler 10 on which this comparison is based produces 5,000 cubic feet per minute (approx. 140,000 liters per minute).

It is to be understood that the present invention 10 is not limited to the sole embodiment described above, but encompasses any and all embodiments within the scope of the following claims.

We claim:

1. An evaporative air cooler employing water for cooling comprising: vertical outer walls of evaporative pads; tank means holding a supply of water and retaining water not evaporated by said evaporative material; pumping means forcing said water supply to a top of said evaporative material; conduit means conducting said water supply from said pumping means to the top of said evaporative material; an electric motor; a direct driven axial fan having an axis of rotation and having more than four fan blades; and an air inlet ring, said axial fan forcing air downwardly through said air inlet ring, said inlet ring defining an aperture centrally located within said evaporative air cooler, said inlet ring comprising a substantially cylindrical portion concentrically surrounding said fan and a flared portion upstream of the cylindrical portion with respect to the direction of air flow, said flared portion curving radially outwardly with respect to the cylindrical portion, whereby laminar air flow is maintained upon operation of said fan, and said evaporative air cooler operates with reduced objectionable air flow noise;

a speed controller connected to alternating electrical power, said speed controller providing alternating current to said motor of frequency characteristics selectively identical to an input frequency of the alternating electrical power and reduced therefrom, whereby said motor runs at a manufacturer's predetermined efficiency at any selected speed equal to and less than a manufacturer's predetermined nominal speed, to rotate said fan at a selected output;

said fan having adjustable blade pitch, whereby said fan and said motor operate to move a selected quantity of air at a selected pressure at a speed selected to avoid vibration of said motor and said fan.

2. The evaporative cooler of claim 1, said tank means comprising a receptacle opening upwardly and being located below said evaporative pads, said tank means including:

sensor means to detect a preset level of dissolved minerals in said water; and valve means operable to discharge said water from said tank means responsive to a signal generated by said sensor means upon detection of a preset level of dissolved minerals.

3. The evaporative cooler of claim 1, said fan having ten fan blades.

4. The evaporative cooler of claim 1, said evaporative pads comprising sheets of treated cellulosic cross-fluted paper.

5. The evaporative cooler of claim 1, further including means to distribute water being discharged from a water conduit laterally across the thickness of said evaporative pads, said means to distribute water comprising small sections of treated cellulosic cross-fluted paper, being disposed between and adjacent to said water discharge conduit and said evaporative pads, said small sections being arranged such that said sheets of cross-fluted paper run at a right angle to corresponding sheets of cross fluted paper of an adjacent said evaporative pad, whereby said small sections span the entire width of said evaporative pad, and whereby water is conducted to said evaporative pad so as to wet said evaporative pad throughout the entire thickness thereof from top to bottom.

6. The evaporative cooler of claim 1, said conduit means including at least one horizontal conduit having means defining discharge orifices therein, releasing water above said evaporative pads, said water flowing thereonto, said orifices comprising radial slots extending partially into said horizontal conduit, said radial slots opening upwardly.

7. The evaporative cooler of claim 6, said conduit means comprising two vertical conduits originating at said pump means and each said vertical conduit branching into two horizontal conduits, said radial slots being located in both said two horizontal conduits.

8. The evaporative cooler of claim 7, each one of said two vertical conduits including valve means controlling the amount of water flow through its associated vertical conduit.

9. The evaporative cooler of claim 1, said tank means being made from a non-metallic material.

10. The evaporative cooler of claim 9, said non-metallic material comprising fiberglass.

11. The evaporative cooler of claim 9, said non-metallic material comprising plastic.

* * * * *